United States Patent Office 3,321,413
Patented May 23, 1967

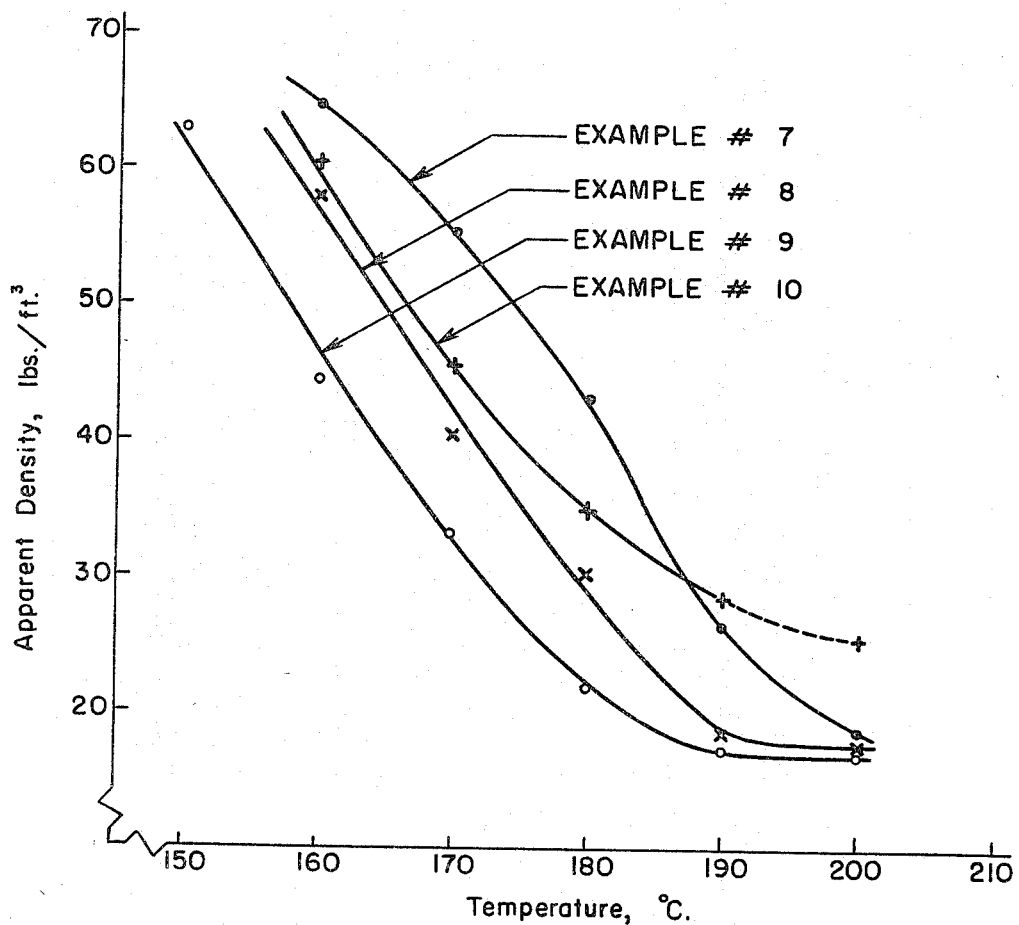

3,321,413
ACTIVATED AZODICARBONAMIDE BLOWING AGENT COMPOSITIONS
Charles P. Riley, Jr., Lowell, Richard Strauss, Lexington, and Henry R. Lasman, Wilmington, Mass., assignors, by mesne assignments, to National Polychemicals, Inc., Wilmington, Mass., a corporation of Massachusetts
Filed Feb. 21, 1964, Ser. No. 346,492
21 Claims. (Cl. 260—2.5)

ABSTRACT OF THE DISCLOSURE

The decomposition temperature of a composition comprising a polyvalent metal salt, an alkali metal salt, and azodicarbonamide is lowered to 140° C. or below by the use of a hydroxy amine compound. Compositions which include finely divided azodicarbonamide, a zinc salt, a potassium salt and monoethanol amine or a glycol amine have an initial blowing temperature below that of oxybisbenzenesulfonyl hydrazide.

---

Our invention relates to compositions to activate chemical blowing agents, to the activated blowing agent compositions and to plastic compositions containing these compositions. In particular our invention concerns a composition to activate azodicarbonamide compositions and provide a substantial and unexpected lowering of the initial decomposition temperature of the azodicorbonamide. This application is a continuation-in-part of Ser. No. 257,567, filed Feb. 11, 1963, now Pat. No. 3,305,496.

The selection of a suitable chemical blowing agent compound for forming cellular and foamed plastic is commonly made with reference to the initial temperature and temperature range at which the blowing agent decomposes to evolve gas and to the fluidity and temperature range of the plastic to be blown. Azodicarbonamide has a decomposition temperature in air of about 195° to 200° C. and about 190° C. in dioctyl phthalate. For many applications it is desirable to have azodicarbonamide decompose at a much lower temperature. Decomposition at a lower temperature would permit a reduction in the heat degradation of the plastic composition in which the chemical blowing agent is incorporated. Further lower decomposition temperatures would permit shorter processing cycles and allow enhanced decomposition rates thereby permitting lower processing temperatures or shorter residence times or a combination thereof. Also, it is commercially desirable to reduce the initial and range of decomposition temperatures of azodicarbonamide to or lower than the initial decomposition temperature of oxybisbenzenesulfonyl hydrazine, since azodicarbonamide is a more economical source of gas.

It is now known that some heavy metal compounds have an activating effect on chemical blowing agents, that is, they tend to lower the decomposition temperature at which the blowing agent evolves gas. However, even the most active heavy metal compounds fail to lower the decomposition temperature of azodicarbonamide below about 160° C. For example, dibasic lead phosphite lowers the decomposition temperature of azodicarbonamide in a typical vinyl resin plastisol composition to about 170° C.

It is, therefore, an object of our invention to provide a composition which will substantially lower the initial decomposition temperature of azodicarbonamide.

It is also an object of our invention to provide an activated azodicarbonamide composition having a decomposition temperature less than the initial decomposition temperature of oxybisbenzenesulfonyl hydrazide. It is a further object of our invention to provide an organic resinous plastic composition containing an azodicarbonamide blowing agent which composition is capable of being decomposed to produce a chemically blown cellular structure at an initial decomposition temperature below 130° C.

Further objects and advantages of our invention will be apparent to those persons skilled in the art from the following description of our invention taken in conjunction with the accompanying drawing wherein there is shown a graphical representation of the degree of expansion versus the temperature of a vinyl resin plastisol composition containing activated azodicarbonamide compositions of our invention in comparison with oxybisbenzenesulfonyl hydrazide and activated azodicarbonamide of our parent application.

We have discovered that the decomposition temperature of azodicarbonamide is substantially lowered in the presence of conventional heavy metal salt activators such as polyvalent metal stabilizers in combination with alkali metal salts and an activating amount of a hydroxy amine compound. Aliphatic hydroxy amine compounds and their salts in combination with alkali and heavy metal salts are particularly effective in lowering the initial decomposition temperature of azodicarbonamide to 140° C. and below, e.g. between about 110° C. and 140° C. Our discovery permits azodicarbonamide to be more widely employed as an efficient chemical blowing agent especially for producing open or closed cellular plastic products at low oven temperature and shorter oven residence times.

We have found that hydroxy amine compounds overcome many of the disadvantages associated with prior activators. For example (azodicarbonamide has been activated in rubber compositions by the addition of glycols as described in U.S. Patent 2,806,073. However, these glycols are not compatible in vinyl resin or other polymeric systems and fail to give very low activation temperatures. Activation of azodicarbonamide in vinyl systems has been conventionally accomplished by the use of heavy metal salts to lower the activation temperature to about 160° C. to 170° C. Some amines have been suggested as activators, but these amines have usually given flat activation curves i.e. activation occurred at very low temperatures such as at room temperatures which produced very unstable mixtures. Further, these amines were not wholly compatible with vinyl systems and tended to provide discoloration and other adverse side effects in vinyl resin compositions.

We have found that aliphatic hydroxy amine compounds are unique, in that while they activate azodicarbonamide slightly when used alone, when used in combination with heavy metal salts and alkali metal salts, the initial decomposition temperature of azodicarbonamide is markedly and substantially lowered. Also aliphatic hydroxy amines are more compatible with vinyl resin systems and other polymers. For example, diglycol amine is wholly compatible with vinyl chloride resin systems, doesn't produce unstable mixtures and has a considerably reduced tendency to produce discoloration.

Our hydroxy amines include hydroxy amine compounds like alkanol amines and polyglycol amines. Useful amines include: primary alkanol amines like ethanol amine ($HO-CH_2-CH_2-NH_2$); 2-(2-aminoethoxy) ethanol ($HO-CH_2CH_2OCH_2CH_2NH_2$); dipropyleneglycol amine ($HO-CH_2CH_2CH_2O-CH_2CH_2CH_2NH_2$); triglycol amine, etc., as well as other short-chain polymers of ethylene and propylene oxide with a primary amine group at the one end of the molecule and a hydroxyl group at the other end of the molecule. These latter amines are (amino alkoxy) alkanols having for example, $C_2-C_6$ alkoxy groups like ethoxy and propoxy groups and $C_2-C_6$ alkanols.

Of particular interest are polyglycol amines and amine salts derived from ethylene oxide, propylene oxide, and epichlorohydrin such as:

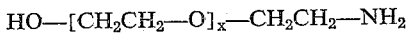

and

where $x$ is an integer, such as from 0 to 8. These amines may be liquids or solids and may have molecular weights of up to 3,000 or more. Secondary amines like diethanol amine and tertiary amines like triethanol amines may also be used. We have found monoethanol amine, although effective, is less selective than the preferred polyglycol amines, and has a higher tendency to promote premature blowing. The preferred compounds are those liquid polyglycol amines such as diglycol amine, which are easily dispersible and form stable, nondiscoloring, activating compositions with organo metal salts or mixtures of polyglycol amines and monoethanol amine.

The heavy metals of our composition comprise those polyvalent heavy metals known to have an activating effect on azodicarbonamide, and may include those metals of Group II, such as calcium, strontium, barium and particularly Group IIb, such as magnesium, zinc, cadmium, and mercury and metals of Group IV, such as titanium, tin, lead and the like, and combinations thereof. Particular metals which have a pronounced activating effect are tin, lead, cadmium, barium, zinc and titanium. The alkali metals of our composition include those monovalent metals of Group I, and particularly Group Ia, such as sodium, potassium, lithium, cesium and combinations thereof with potassium being particularly effective.

The metal and alkali metal-containing compounds of our compositions may be employed as organic or inorganic compounds or combinations thereof. For example, inorganic salts may include such compounds as oxides, carbonate, phosphites, halides, phosphates and the like. Suitable specific compounds would include zinc oxide, lead carbonate, potassium chloride, lead dibasic phosphite and the like. However, the use of compounds containing organic radicals is generally recommended for use with plastic compositions especially vinyl resin compositions to promote solubility of the compounds into the organic plastic compositions. Suitable oil soluble organic radicals comprise aromatic, arene, aliphatic, alicyclic, heterocyclic, alkylene, and hydrocarbon radicals, and the like. For example, aliphatic radicals include: alkyl and short and long-chain fatty acid radicals like tallates, oleates, acetates, propionates, 2 ethyl hexoates, ricinoleates, myristates, octoates, stearates, resin soaps and the like, and mixtures thereof; alicyclic radicals include naphthenes and the like; aromatics include phthalates, phenates, benzoates, and the like.

The heavy metal and alkali metal-containing compounds of our compositions are often formed by the reaction of the metal or a metal salt with an organic acid such as a mono or polycarboxylic acid or its derivatives to form the corresponding metal salt or metal soap. Oil soluble alkali soaps of long-chain fatty acids of more than six carbon atoms, together with oil soluble heavy metal containing soaps of from two to 12 carbon atoms have been found to be an excellent combination for use in vinyl resin compositions. Conventional metal salt vinyl stabilizers may be employed as the metal salts of our invention.

Granulate azodicarbonamide is decomposed in the presence of our activating composition at very low temperatures. It has also been found that when very finely divided azodicarbonamide is employed in combination with our activating composition, low decomposition temperatures may be obtained. For example, it has been found that azodicarbonamide precipitated, or ground to a particle size range of from about 0.1 to 5 microns with an average particle size range of about 2.0 to 1.8 microns or less in combination with our activating compositions, evolves gas at temperatures of 130° C. or lower.

Activation of azodicarbonamide is achieved when the weight ratio of the alkali metal to the heavy metal is from about one to five to five to one with optimum results observed at a ratio about one to two. The activating composition of our invention is commonly employed in a ratio of activating composition to the azodicarbonamide of from one to ten to about four to one with good results obtained at a ratio of about one to two.

The hydroxy amine compounds may be profitably employed at about the same low level weight as the alkali metal in the activating composition. However, the amount of the hydroxyamine, as well as the alkali metal may vary depending upon the desired amount of activation. A representative activating composition might include a liquid mixture of a plasticizer, an oil soluble heavy metal salt, an alkali metal fatty acid soap, and from 5 to 50 weight percent of an aliphatic hydroxy amine compound. In this case the activating composition is added to the polymer composition and the azodicarbonamide separately incorporated in the composition.

The activated azodicarbonamide composition may be incorporated in a plastic composition in a sufficient amount to effect the desired chemical blowing action. This amount may vary from about 0.5 to 50 parts of the activated azodicarbonamide composition to 100 parts of the resin content of the plastic composition. In atmosphere or in open mold blowing operations, such as in blowing or forming blown, cellular plastic sheets or layers on a carrier sheet from one to ten parts per one hundred parts of the resin are commonly employed. In closed mold or pressure molding operations higher amounts of from ten to fifty parts per one hundred parts of the resin are often used.

The heavy metal compound, alkali metal compound, hydroxyamine compound and the azodicarbonamide may be premixed together without or without a plasticizer or added separately, or in any combination, to the plastic composition. The desired heavy metal and alkali metal concentration to obtain activation may be obtained from other ingredients added to the plastic composition for other purposes. For example, all or part of the heavy metal concentration may be obtained from heavy metal phosphites or soaps or alkaline earth-heavy metal soaps added to the plastic composition as heat and light stabilizers. One method of preparing suitable compositions for use is to form a fluid slurry of the activating compositions or the activated azodicarbonamide compositions or a concentrated plasticizer-resin mixture.

The activated azodicarbonamide compositions of our invention may be employed with a wide variety of plastic compositions to produce open or closed cellular structures in block, sheet or in other form. Our composition will find particular utility with those liquid thermosetting and thermoplastic compositions which require lower decomposition temperatures than those normally obtained with azodicarbonamide. Suitable gas-retentive and gas-expandable, organic polymeric plastic materials and compositions would include but are not limited to: vinyl resins and vinyl resin compositions which may comprise a vinyl resin dispersed in a high boiling plasticizer which plasticizer solvates the resin at an elevated temperature to produce a fused, flexible vinyl resin; natural and synthetic elastomers, like natural rubber and natural rubber latices; butyl and chlorobutyl rubbers, ethylene-propylene rubbers and terpolymers thereof; vinyl-diene copolymers like styrene-butadiene copolymers; nitrile rubbers like acrylonitrile-diene copolymers; polydienes like polybutadienes; polyisoprenes; polychloroprene; silicones, epoxy resins; phenolic resins like phenol-formaldehyde resins; urea-aldehyde resins; polyolefines particularly low melting point, branch chain polyethylene and polypropylene and the like; polyesters; alkyd resins; polystyrene; olefine polysulfides; polyethers; cellulosic esters and other resins; and mixtures and combinations thereof. The plastic compositions may be in latex, bulk, emulsion or solution form.

The vinyl resins are often employed in high boiling point ester-type plasticizers, such as the aliphatic and aromatic-alkyl esters like dialkyl and monoalkyl phthalates. These vinyl halide resins include polyvinyl chloride and copolymers of vinyl chlorides with vinyl esters of short-chain fatty acids, like vinyl acetate, vinyl propionate, as well as other vinyl halides such as vinylene and vinylidiene chlorides and the like, and copolymers with dibutenoic acid esters and the like and combinations thereof.

These blowable, organic plastic materials are characterized by being capable of setting to a normally solid state either by cooling or curing, and have sufficient consistency in tensile strength at temperatures of from about 80° C. to 200° C. or higher, to retain the expanded structure resulting from the evolvement of the gas either in the mold or when removed therefrom.

The plastic materials in which the activated azodicarbonamide compositions of our invention are incorporated can be formed either before or after blowing by coating, slush molding, compression or injection molding, extrusion or combinations thereof. The foam material can be retained in cellular structure by cooling in the case of thermoplastics and by cooling and curing with curing agents or effecting cross-linking in the case of thermosetting materials. The cellular material can be formed on sheets such as paper, canvas, cloth plastic films, screens and the like, and will find particular utility such as shoe soleing, gaskets, shock absorbing functions and the like.

The plastic materials may also contain other ingredients and additives to enhance other properties such as to promote processing of final product acceptance. These additional materials may include heat and light stabilizers, plasticizers, antioxidants, dispersing agents, wetting agents, lubricating agents, pigments, dyes, blending resins, curing agents and the like, in combination thereof. These additives would include organic phosphorous compounds, epoxies, low and high boiling ester-type plasticizers, low volatility polyols, fatty acids and fatty acid soaps, alkanol amines, amines, polyalkaline polyamines, like diethylenetriamine and low molecular glycols and the like. These plastic materials may also include inert filler materials, such as clays, metal oxides, carbonates, whitenings, asbestos, glass fibers, woodflour, diatomaceous earth and the like in a ratio of from 20 to 300 parts of inert filler material to each hundred parts of resin.

The activator compositions, or the activated azodicarbonamide compositions, of our invention can be incorporated into the material by a number of methods. They may be added as a plasticizer slurry or in an organic solvent solution to the resin-plasticizer composition. They may be admixed with the solid resin or added directly to the resin during processing or by any method wherein the azodicarbonamide and the activating composition are combined and uniformly admixed in the plastic composition.

The following examples illustrate the effectiveness of our hydroxyamine compounds in conjunction with the metal-organic salts as activators for azodicarbonamide. In this series of tests, the metal soap portion of the activator was similar to those described in Example 2 of our parent application. The decomposition temperature was measured by a differential thermal analysis technique: A sample containing, for example, 0.25 gm. of the blowing agent and the indicated quantities of activator and a plasticizer dioctylphthalate (DOP) was placed in one test tube. In a second test tube was placed 0.25 gm. of silica and 4 grams of DOP. Thermocouples were inserted in each test tube. Both test tubes were immersed in a heating bath and heated at a rate of about 12° C. per minute.

The difference in temperature between the sample and the blank, plotted against the temperature of the blank, provides a sensitive measure of the decomposition temperature of the sample. The results found were as follows:

| Ex. | Composition | Grams | Decomposition, Initial | Temperature (° C.), Peak |
|-----|-------------|-------|------------------------|--------------------------|
| 1 | Azodicarbonamide* | 0.25 | 184 | 208 |
|   | DOP | 4.00 | | |
| 2 | Azodicarbonamide | 0.25 | 142 | 168 |
|   | Zinc 2-ethylhexoate | 0.10 | | |
|   | Potassium oleate | 0.038 | | |
|   | DOP | 4.36 | | |
| 3 | Azodicarbonamide | 0.25 | 124 | 157 |
|   | Zinc 2-ethylhexoate | 0.11 | | |
|   | Potassium oleate | 0.04 | | |
|   | Diglycolamine | 0.06 | | |
|   | DOP | 4.04 | | |
| 4 | Azodicarbonamide | 0.25 | 119 | 152 |
|   | Zinc 2-ethylhexoate | 0.11 | | |
|   | Potassium oleate | 0.04 | | |
|   | Diglycolamine | 0.03 | | |
|   | Monoethanolamine | 0.03 | | |
|   | DOP | 4.04 | | |
| 5 | Azodicarbonamide | 0.25 | 112 | 150 |
|   | Zinc 2-ethylhexoate | 0.11 | | |
|   | Potassium oleate | 0.04 | | |
|   | Monoethanolamine | 0.06 | | |
|   | DOP | 4.04 | | |
| 6 | Oxbisbenzenesulfonylhydrazide | 0.5 | 145 | 160 |
|   | DOP | 4.0 | | |

*All azodicarbonamide used in these and succeeding examples had an average particle size of about 1.6 to 1.9 microns.

In the second series of runs, the activator compositions of Examples 2, 3, and 5 were tested in a pilot plant hot-air circulating oven. Plastisol compositions containing the blowing agent and activators were cast onto 12″ x 12″ sections of release paper, with an initial plastisol thickness of 0.020 inch. The samples were passed through the oven in a controlled period of time. Each composition was run at a series of oven temperatures, ranging from 150° C. to 200° C. In all runs the residence time in the oven was 60 seconds. The degree of decomposition of the blowing agent was determined by measuring the apparent density of the expanded sample. The formulation used was:

Composition: Parts by weight
Polyvinylchloride, plastisol grade__ 100.0
DOP _____ 60.0
Butyl-octyl-phthalate _____ 30.0
Epoxidized soybean oil_____ 5.0
Titanium dioxide_____ 5.0
Blowing agent, activator_____ Variable as shown in Examples 7, 8, 9 and 10.

The compositions of the activators in Examples 7, 8, and 9 correspond to the compositions of the activators in Examples 2, 3, and 5, respectively.

| Blowing agent and Activator Composition | Example 7, Parts by Weight | Example 8, Parts by Weight | Example 9, Parts by Weight | Example 10, Parts by Weight |
|---|---|---|---|---|
| Azodicarbonamide | 2.0 | 2.0 | 2.0 | |
| Zinc 2-ethylhexoate (22% zinc) | 1.16 | 0.86 | 0.86 | |
| Potassium oleate (85% active) | 0.42 | 0.32 | 0.32 | |
| Diglycolamine | | 0.50 | | |
| Monoethanolamine | | | 0.50 | |
| DOP | 0.42 | 0.32 | 0.32 | |
| Oxybisbenzenesulfonylhydrazide | | | | 3.5 |

The drawing shows the results of Examples 7, 8, 9 and 10 in producing a cellular vinyl chloride resin product with the degree of expansion of the resin plotted as the apparent density in pounds per cubic foot versus the oven temperature in degrees centigrade. Examples 8 and 9 employing hydroxy amine compounds produced a consistently lower density foam product at a given temperature than either the oxybisbenzenesulfonylhydrazide now commonly employed at these temperatures or even the improved activated heavy metal-alkali soap azodicarbonamide composition of our parent application.

The results of the oven tests confirm the laboratory activation tests; i.e., the addition of aliphatic hydroxyamine compounds to the metal soap activator considerably improves the activation and markedly reduces the decomposition temperature of azodicarbonamide below that of oxybisbenzenesulfonylhydrazide.

Our invention permits the use of very low decomposition temperature and shorter oven residence times when azodicarbonamide is employed as the blowing agent in combination with our activating compositions. In this manner cellular plastic foam products and materials may be prepared where the initial decomposition temperature of the blowing agent is desired to be between 110° to 140° C.

What we claim and desire to protect by Letters Patent is:

1. An activated blowing agent composition which composition comprises: azodicarbonamide, a heavy polyvalent metal salt which reduces the decomposition temperature of the azodicarbonamide, an alkali metal salt, and a sufficient amount of an aliphatic hydroxy amine to reduce the initial decomposition temperature of the azodicarbonamide below about 140° C.; the ratio of heavy metal to alkali metal ranging from about 5 to 1 to 1 to 5 and the ratio of the heavy metal and the alkali metal to azodicarbonamide ranging from about 1 to 10 to about 4 to 1.

2. A composition as described in claim 1 wherein the hydroxy amine is monoethanol amine.

3. A composition as described in claim 1 wherein the hydroxy amine is an amino alkoxy alkanol.

4. An activated blowing agent composition which composition comprises: azodicarbonamide; a polyvalent metal salt, the metal being selected from the group consisting of zinc, cadmium, barium, tin, titanium and lead; an oil soluble potassium salt; and a sufficient amount of an alkanol amine to reduce the initial decomposition temperature of the azodicarbonamide to below about 140° C., the ratio of heavy metal to potassium ranging from about 5 to 1 to 1 to 5.

5. A composition as described in claim 4 wherein the alkanol amine is a polyglycol amine.

6. An activated blowing agent composition which composition comprises: azodicarbonamide; and oil soluble zinc salt; an oil soluble potassium salt; and a sufficient amount of an alkanol amine to reduce the initial decomposition temperature of the azodicarbonamide to below about 140° C.

7. A composition as described in claim 6 wherein the alkanol amine is diglycol amine.

8. A composition as described in claim 6 wherein the alkanol amine is monoethanol amine.

9. A composition capable of being blown into a cellular plastic product at a low temperature which composition comprises: a thermoplastic vinyl resin; a plasticizer; a blowing amount of azodicarbonamide; a heavy polyvalent metal salt selected from the group consisting of zinc, lead, barium, titanium, tin and cadmium; an alkali metal salt; and a sufficient amount of an alkanol amine to decompose the azodicarbonamide at an initial decomposition temperature of below about 140° C.; the ratio of metal to alkali metal ranging from about 5 to 1 to 1 to 5, and the ratio of metal and alkali metal to azodicarbonamide ranging from about 1 to 10 to about 4 to 1.

10. A composition as described in claim 9 wherein the alkali metal is potassium.

11. A composition as described in claim 9 wherein the amine is monoethanol amine.

12. A composition as described in claim 9 wherein the amine is a polyglycol amine.

13. In a method of producing a cellular product from an organic, polymeric resinous plastic characterized by having a fluid state below about 190° C. and capable of retaining and being expanded by a blowing gas and containing therein a blowing amount of azodicarbonamide and a polyvalent metal salt in an amount sufficient to reduce the decomposition temperature of the azodicarbonamide, and an alkali metal salt and thereafter heating the plastic composition to a temperature sufficient to produce a blown cellular product, the improvement which comprises: adding to the resinous plastic composition prior to heating an aliphatic hydroxy amine compound in an amount sufficient to reduce the initial decomposition temperature of the azodicarbonamide to below that of oxybisbenzenesulfonyl hydrazide.

14. In the method of producing a thermoplastic vinyl resin cellular product from a plastisol composition comprising: plasticizer, a vinyl chloride resin, a blowing amount of azodicarbonamide, a polyvalent metal salt selected from the group consisting of zinc, tin, cadmium, lead, barium and titanium, and an oil soluble organic alkali metal salt in a ratio of heavy metal to alkali metal of from about 1 to 5 to 5 to 1, and the heating of said plastisol composition to decompose the blowing agent to produce a cellular product, the improvement which comprises: adding to said plastisol composition prior to heating an activating amount of an alkanol amine in a quantity sufficient to reduce the initial decomposition temperature of the azodicarbonamide to between about 110° C. and 140° C.

15. A method as described in claim 14 wherein the amine is monoethanol amine.

16. A method as described in claim 14 wherein the amine is diglycol amine.

17. A composition as described in claim 1 wherein the azodicarbonamide has a particle size range of from about 0.1 to 5.0 microns.

18. A composition as described in claim 1 wherein the hydroxy amine compound is present in an amount of from about 5 to 50 percent by weight of the composition.

19. A method as described in claim 13 wherein the azodicarbonamide has a particle size range of from about 0.1 to 5.0 microns.

20. A method as described in claim 13 wherein the alkali metal salt includes a potassium salt, the polyvalent metal salt includes a zinc salt, and the amine includes monoethanol amine.

21. A method as described in claim 13 wherein the amine compound includes a glycol amine.

No references cited.

MURRAY TILLMAN, *Primary Examiner.*

W. J. BRIGGS, *Assistant Examiner.*